Sept. 20, 1927. 1,643,067
F. G. GOODMAN
WINDSHIELD WIPER
Filed April 29, 1926
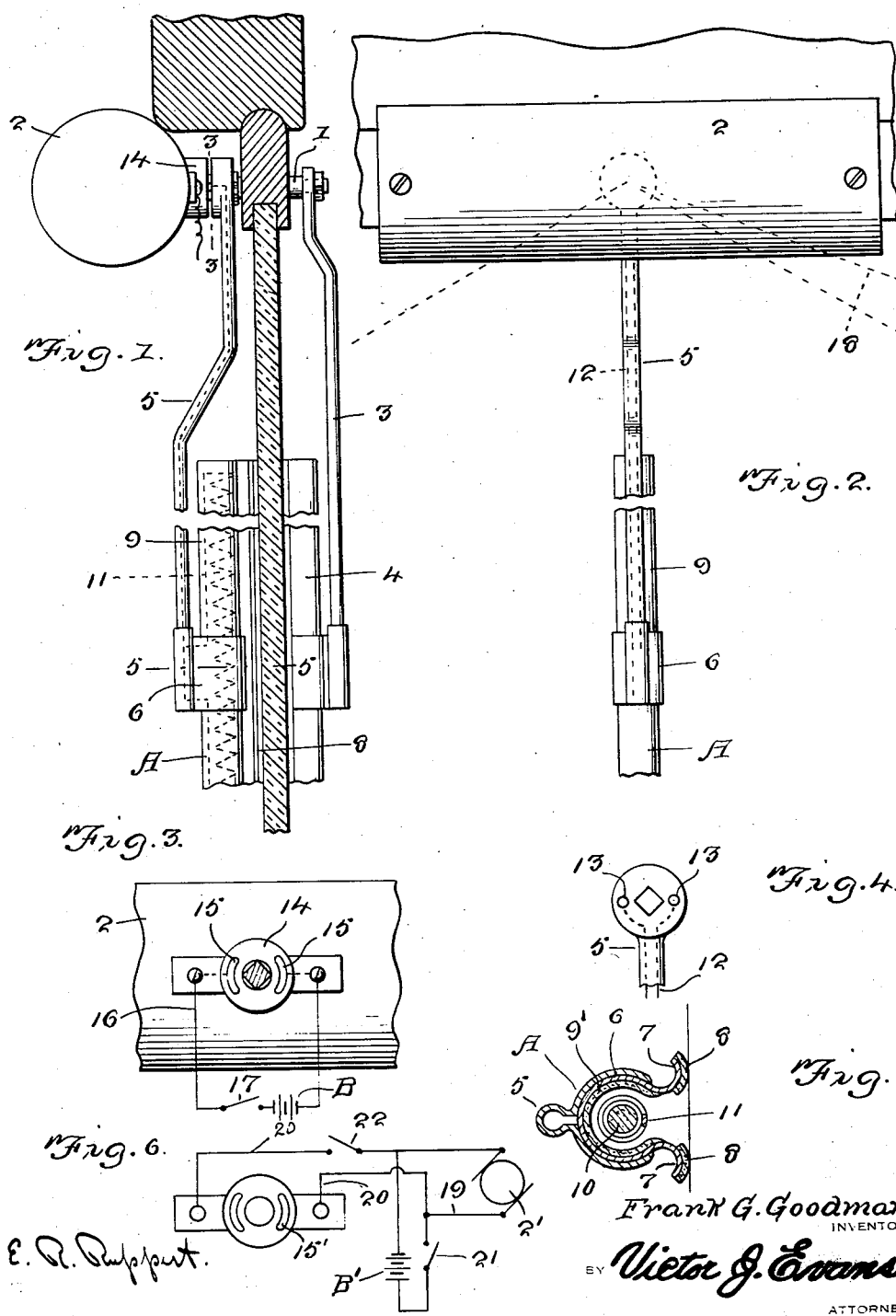

Patented Sept. 20, 1927.

1,643,067

UNITED STATES PATENT OFFICE.

FRANK G. GOODMAN, OF SIOUX FALLS, SOUTH DAKOTA.

WINDSHIELD WIPER.

Application filed April 29, 1926. Serial No. 105,529.

This invention relates to improvements in windshield wipers, the general object of the invention being to provide exterior and interior wipers for cleaning both the inner and outer faces of the transparent member of the windshield or other window, with electric means associated with the inner wiper for heating the transparent member as the wiper passes over it.

Another object of the invention is to provide brush means on a stationary part and on a part of the wiper arm through which the electric current will pass to the heater carried by the arm, said brush means being so arranged that the current will be automatically broken when the wiper is moved into its upper and inoperative position.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a fragmentary sectional view through a windshield, showing the invention in use.

Figure 2 is a front view of the inner part of the wiper.

Figure 3 is a section on line 3—3 of Figure 1, and showing the circuit diagrammatically.

Figure 4 is a view of the upper portion of the arm of the interior wiper.

Figure 5 is a section on line 5—5 of Figure 1.

Figure 6 is a diagrammatic view of the circuits when the invention is used with an electrically operated wiper.

In these views, 1 indicates the shaft of the motor 2 which passes through a portion of the frame of the windshield and which has connected to its outer end the arm 3 of the wiper 4, these parts being of the usual or any desired construction. The motor 2 may be of the electric type or of the vacuum type.

In carrying out my invention, I secure the upper end of an arm 5 to the shaft 1, on the inner side of the windshield, and I attach to the lower end of this arm by means of a clamping clip 6 a combined wiper and heater A which is composed of a semi-circular member 9 having its edges extended to form curved flanges 7, these flanges carrying the wiper mediums 8, the casing 9' of heat non-conducting material which is also of semi-circular form and the core 10 which carries the heating coil 11. The heat from the coil will pass through the opening in the casing 9 and between the flanges 7 and strike the windshield glass on that part which lies between the wipers 8. Thus the heat will be retained and its full effect will come against that portion of the glass over which the member A is traveling so that the glass being operated on by the inner and outer wipers will be heated. Thus the windshield will be effectively cleaned not only of moisture but also of snow and ice, as the heat given off by the heating coil will melt the ice and snow on the outer face of the windshield so that the wiper 4 can easily remove it.

As shown, the two wipers move in unison and the wiper 4 is directly opposite the heating space of the wiper A so that said wiper 4 will always be acting on that part of the windshield which is being heated by the wiper A.

The conductors 12 from the coil 11 pass up through the arm 5 which is made hollow for this purpose, and their upper ends are connected to the spring terminals 13 carried by the enlarged end of said arm 5. A boss 14 is formed on the motor 2 around the shaft 1 and this boss is provided with a pair of arc-shaped contacts 15 with which the contacts 13 will engage during the oscillatory movement of the wiper. These contacts 15 are electrically connected by the conductors 16 with a battery B, a switch 17 being placed in the circuit.

Thus as the wiper oscillates, current will flow to the heating coil when the switch 17 is closed through the connections shown. I so arrange the contacts 15 that when the wiper is shoved up into its inoperative position, as shown by the dotted line 18 in Figure 2, the contacts 13 will run off the contacts 15 and thus automatically break the circuit even though the switch 17 is still closed.

When the device is used with an electrically operated wiper, I prefer to arrange the circuits as shown in Figure 6. This figure shows the motor 2' of the wiper as electrically connected by the conductors 19 with the battery B' and the contacts 15' are also electrically connected with said circuit by the conductors 20. A switch 21 is arranged in the circuit 19 and a switch 22 in the circuit 20. Thus by closing both switches, current will flow to both the motor 2' and to the heating element through the contacts 15'. If it is not desired to use the heating element, the switch 22 can be opened so as to break the circuit to the heating element, but current will still pass to the motor 2'. By opening the switch 21 both circuits will be broken.

From the foregoing, it will be seen that I have provided simple and effective means for wiping both faces of a windshield and for heating the inner face so that snow and ice, as well as moisture, will be removed from the windshield by the operation of the device.

The invention is mainly designed for use with motor operated wipers but it will be understood that it may be used with a hand operated device, current being supplied to the heating coil in any desired manner.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A wiper device comprising a wiper element of channel shape in cross section forming a chamber, with an extended mouth, the walls of which are rigid and which is adapted to be closed by a transparent member engaged by the element, a heating member in said chamber and wiper means on one edge of the mouth forming part of the element.

2. A wiper device comprising a wiper element of channel shape in cross section forming a chamber, the mouth of the chamber being adapted to be closed by a transparent member engaged by the element, the edges of the element at the sides of the mouth being curved to engage the transparent member, wiper strips on said curved edges and a heating member in the chamber.

In testimony whereof I affix my signature.

FRANK G. GOODMAN.